US007272751B2

(12) United States Patent
Beacom et al.

(10) Patent No.: US 7,272,751 B2
(45) Date of Patent: Sep. 18, 2007

(54) ERROR DETECTION DURING PROCESSOR IDLE CYCLES

(75) Inventors: Thomas Joseph Beacom, Pine Island, MN (US); David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 10/757,790

(22) Filed: Jan. 15, 2004

(65) Prior Publication Data

US 2005/0172172 A1    Aug. 4, 2005

(51) Int. Cl.
*G06F 11/00* (2006.01)
(52) U.S. Cl. ....................................... 714/37
(58) Field of Classification Search ............. 714/37
See application file for complete search history.

(56) References Cited

U.S. PATENT DOCUMENTS

| | | | |
|---|---|---|---|
| 4,924,428 A | * | 5/1990 | Vea ............................... 714/1 |
| 6,360,336 B1 | * | 3/2002 | Christensen et al. .......... 714/47 |
| 6,697,979 B1 | * | 2/2004 | Vorbach et al. .............. 714/724 |
| 2003/0061383 A1 | * | 3/2003 | Zilka ........................... 709/245 |
| 2003/0149546 A1 | * | 8/2003 | Kim ............................ 702/183 |
| 2004/0181656 A1 | * | 9/2004 | Stern et al. ..................... 713/1 |
| 2004/0255099 A1 | * | 12/2004 | Kromer ........................ 712/219 |
| 2005/0055674 A1 | * | 3/2005 | Shidla et al. ................ 717/131 |
| 2005/0066079 A1 | * | 3/2005 | Luick ............................ 710/36 |

FOREIGN PATENT DOCUMENTS

GB            1247746 A     *  9/1971

\* cited by examiner

*Primary Examiner*—Scott Baderman
*Assistant Examiner*—Paul Contino
(74) *Attorney, Agent, or Firm*—Owen J. Gamon (57) ABSTRACT

A method, apparatus, system, and signal-bearing medium that in an embodiment detect an event that will cause idle cycles in the processor and issue diagnostic instructions to the processor during the cycles that would be idle. In another embodiment, the processor is periodically interrupted and diagnostic instructions are issued to the processor, where the diagnostic instructions are selected based on a history of activity at the processor and a log of previous errors at the processor. In this way, errors may be detected at the processor without undue cost and impact on performance.

8 Claims, 4 Drawing Sheets

ERROR DETECTION DURING PROCESSOR IDLE CYCLES

FIELD

This invention generally relates to digital processing hardware and more specifically relates to error detection for a processor.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises a central processing unit (CPU) and supporting hardware necessary to store, retrieve, and transfer information, such as communications buses and memory. It also includes hardware necessary to communicate with the outside world, such as input/output controllers or storage controllers, and devices attached thereto such as keyboards, monitors, tape drives, disk drives, and communication lines coupled to a network. The CPU is the heart of the system. It executes the instructions that comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But, each operation is performed very quickly. Programs that direct a computer to perform massive numbers of these simple operations give the illusion that the computer is doing something sophisticated. What is perceived by the user as a new or improved capability of a computer system is made possible by performing essentially the same set of very simple operations, but doing it much faster and with different data. Therefore, continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of the various components, and particularly the clock speed of the processor. E.g., if everything runs twice as fast but otherwise works in exactly the same manner, the system will perform a given task in half the time. Early computer processors, which were constructed from many discrete components, were susceptible to significant speed improvements by shrinking and combining components, eventually packaging the entire processor as an integrated circuit on a single chip. The reduced size made it possible to increase the clock speed of the processor, and accordingly increase system speed.

In addition to increasing clock speeds, it is possible to improve system throughput by using multiple copies of certain components, and in particular, by using multiple CPUs. The modest cost of individual processors packaged on integrated circuit chips has made this practical. While there are certainly potential benefits to using multiple processors, additional architectural issues are introduced. Without delving deeply into these, it can still be observed that there are many reasons to improve the speed of the individual CPU, whether or not a system uses multiple CPUs or a single CPU. If the CPU clock speed is given, it is possible to further increase the speed of the individual CPU, i.e., the number of operations executed per second, by increasing the average number of operations executed per clock cycle.

Most modern processors employ concepts of pipelining and parallelism to increase the clock speed and/or the average number of operations executed per clock cycle. Pipelined instruction execution allows subsequent instructions to begin execution before previously issued instructions have finished, so that execution of an instruction overlaps that of other instructions. Ideally, a new instruction begins with each clock cycle, and subsequently moves through a pipeline stage with each cycle. Because the work of executing a single instruction is broken up into smaller fragments, each executing in a single clock cycle, it may be possible to increase the clock speed. Even though an instruction may take multiple cycles or pipeline stages to complete, if the pipeline is always full, the processor executes one instruction every cycle.

Some modern high-performance processor designs, sometimes known as "superscalars," have extended the pipeline concept to employ multiple parallel pipelines, each operating concurrently on separate data. Under ideal conditions, each instruction simultaneously causes data to be operated upon in each of the parallel pipelines, and thus there is a potential throughput multiplier equal to the number of pipelines, although in reality this is only a theoretical limit, it being impossible to keep all pipelines full at all times.

In one variation of a parallel pipeline design, known as "Single Instruction, Multiple Data" (SIMD), each instruction contains a single operation code applicable to each of a set of parallel pipelines. While each pipeline performs operations on separate data, the operations performed are not independent. Generally, each pipeline performs the same operation, although it may be possible that some instruction op codes dictate that specific pipelines perform different specific operations.

In another variation of a parallel pipeline design, known as "Multiple Instruction, Multiple Data" (MIMD), each instruction contains separate and independent operation codes for each respective pipeline, each set applicable to a different respective pipeline. When compared with a SIMD design, the MIMD design permits greater flexibility during execution and generally higher utilization of the pipelines, because each pipeline can perform independent operations. But, the need to specify different operations for each pipeline in the instruction substantially increases the length of the instruction, and increases the complexity of the hardware necessary to support an MIMD design. As a result of these countervailing considerations, neither of these two approaches is clearly superior to the other, although SIMD designs appear to be more widely used at the present time.

A multiple parallel pipeline processor, whether employing a SIMD or MIMD design, is an enormously complex device. The multiple pipelines require relatively large integrated circuit chip areas of primarily custom logic. These circuits within these pipelines have a high degree of switching activity and consume considerable power at the operating frequencies typical of such devices. The power density, i.e., the amount of power consumed per unit area of chip surface, tends to be significantly greater within the pipelines than in many other areas of the processor chip, such as cache arrays and registers. This high level of activity and high power consumption makes the multiple pipeline area of the processor chip particularly susceptible to failure.

In a conventional multiple parallel pipeline processor, the failure of any part of a pipeline (even though the failure affects only a single pipeline) generally means that the processor is no longer able to process the instructions, since the instructions assume that all operands will simultaneously be processed by their respective pipelines. Therefore, the entire processor is effectively disabled. This may in turn cause system failure, although in some multiple-processor computer systems, the system can continue to operate, albeit at a reduced throughput, using the remaining functioning processors.

Since processor errors can be so critical, many techniques have been developed for error detection. For example, some error detection processes put parity on data flow, caches, and register files for error detection. Other error detection processes detect invalid states of the processor. For example, the decode logic of a processor may detect an invalid instruction or a latch state that is not valid in a state machine that is controlling long sequences. For more sophisticated machines and critical applications, such as government or space applications, a processor or processors may build two copies of an instruction and then compare the results to ensure that the results from both instructions are equal.

Unfortunately, all of the aforementioned error detection techniques suffer from poor performance, high cost, or both. Error detection techniques for floating point multiply/add operations in a processor are especially difficult to perfect. No processor has ever implemented a practical way to perform parity checking on floating point operations cheaply. Some processors have implemented a cumbersome technique for floating point error detection called "residue," which unfortunately costs about half as much as the base functional logic the residue technique is checking, which is very expensive.

Without a better way to detect errors, processors will continue to suffer from high cost and reduced performance.

SUMMARY

A method, apparatus, system, processor, and signal-bearing medium are provided that in an embodiment detect an event that will cause idle cycles in the processor and issue diagnostic instructions to the processor during the cycles that would be idle. In another embodiment, the processor is periodically interrupted and diagnostic instructions are issued to the processor, where the diagnostic instructions are selected based on a history of activity at the processor and a log of previous errors at the processor. In this way, errors may be detected at the processor without undue cost and impact on performance.

DETAILED DESCRIPTION

Figure 1:
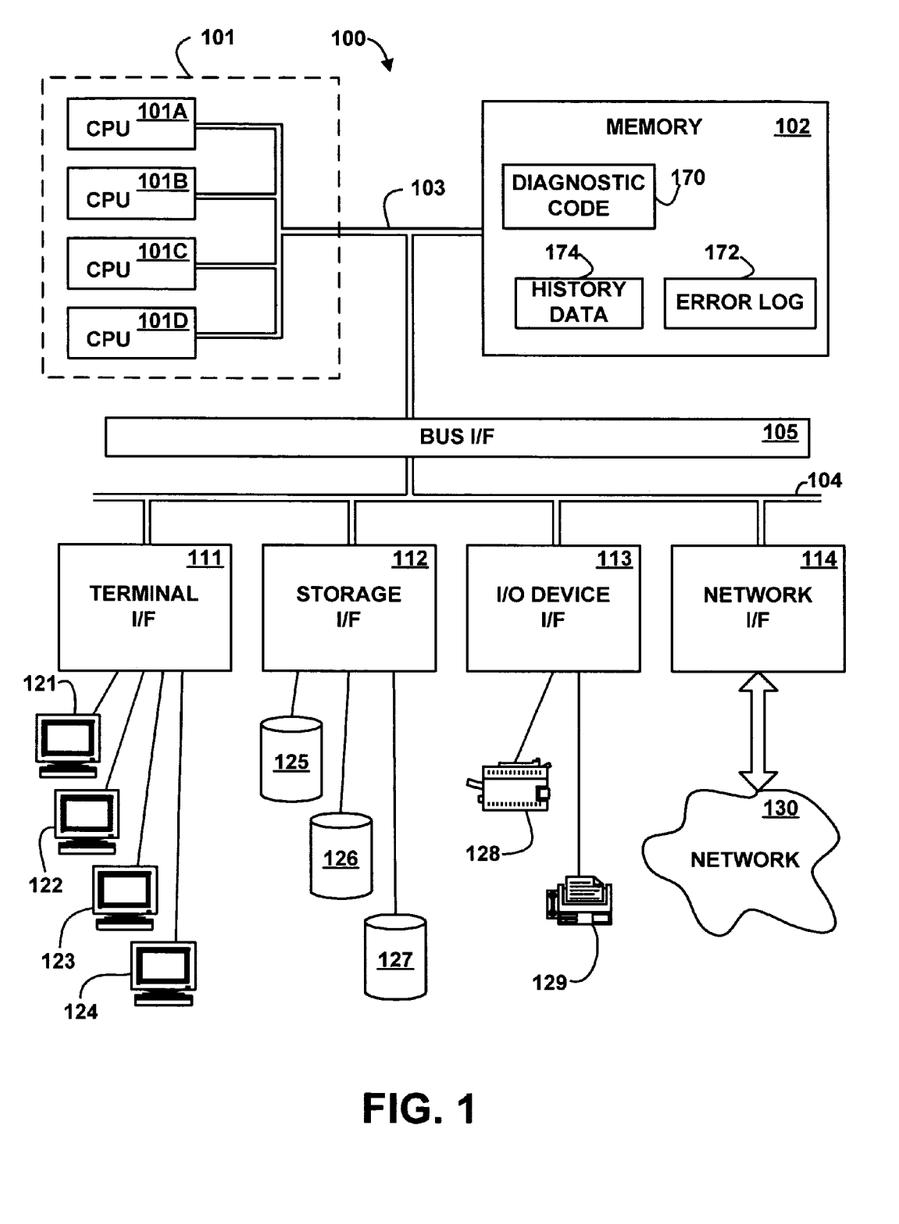
FIG. 1 depicts a high-level block diagram of a computer system, according to an embodiment of the present invention.

Referring to the Drawing, wherein like numbers denote like parts throughout the several views, FIG. 1 depicts a high-level block diagram representation of a computer system 100 utilizing a multiple parallel pipeline processor, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and a bus interface 105.

The computer system 100 contains one or more general-purpose programmable central processing units (CPUs) 101A, 101B, 101C, and 101D, herein generically referred to as processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache. The processors 101 are further described below with reference to FIGS. 2 and 3.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices.

The memory bus 103 provides a data communication path for transferring data among the CPUs 101, the main memory 102, and the I/O bus interface unit 105. The I/O bus interface 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology. The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

Although the main memory 102 is shown in FIG. 1 as a single monolithic entity, the main memory 102 may in fact be distributed and/or hierarchical, as is known in the art. E.g., memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The main memory 102 includes diagnostic code 170, an error log 172, and history data 174. In an embodiment, the diagnostic code 170 includes instructions capable of executing on the CPUs 101 or statements capable of being interpreted by instructions executing on the CPUs 101 to perform the functions as further described below with reference to FIGS. 3 and 4. In another embodiment, the diagnostic code 170 may be implemented in microcode. In another embodiment, the diagnostic code 170 may be implemented in hardware via logic gates and/or other appropriate hardware techniques.

The error log 172 stores information about errors that have occurred in the processor 101. In an embodiment, information may be stored in the error log 172 on a task basis, but in other embodiments information may be stored in the error log 172 on any appropriate basis. The error log 172 is further described below with reference to FIG. 4. The history data 174 includes information about the use of components of the processor 101. The history data 174 is further described below with reference to FIG. 4.

Although the memory bus 103 is shown in FIG. 1 as a relatively simple, single bus structure providing a direct communication path among the CPUs 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

It should be understood that FIG. 1 is intended to depict the representative major components of the computer system 100 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more CPUs 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
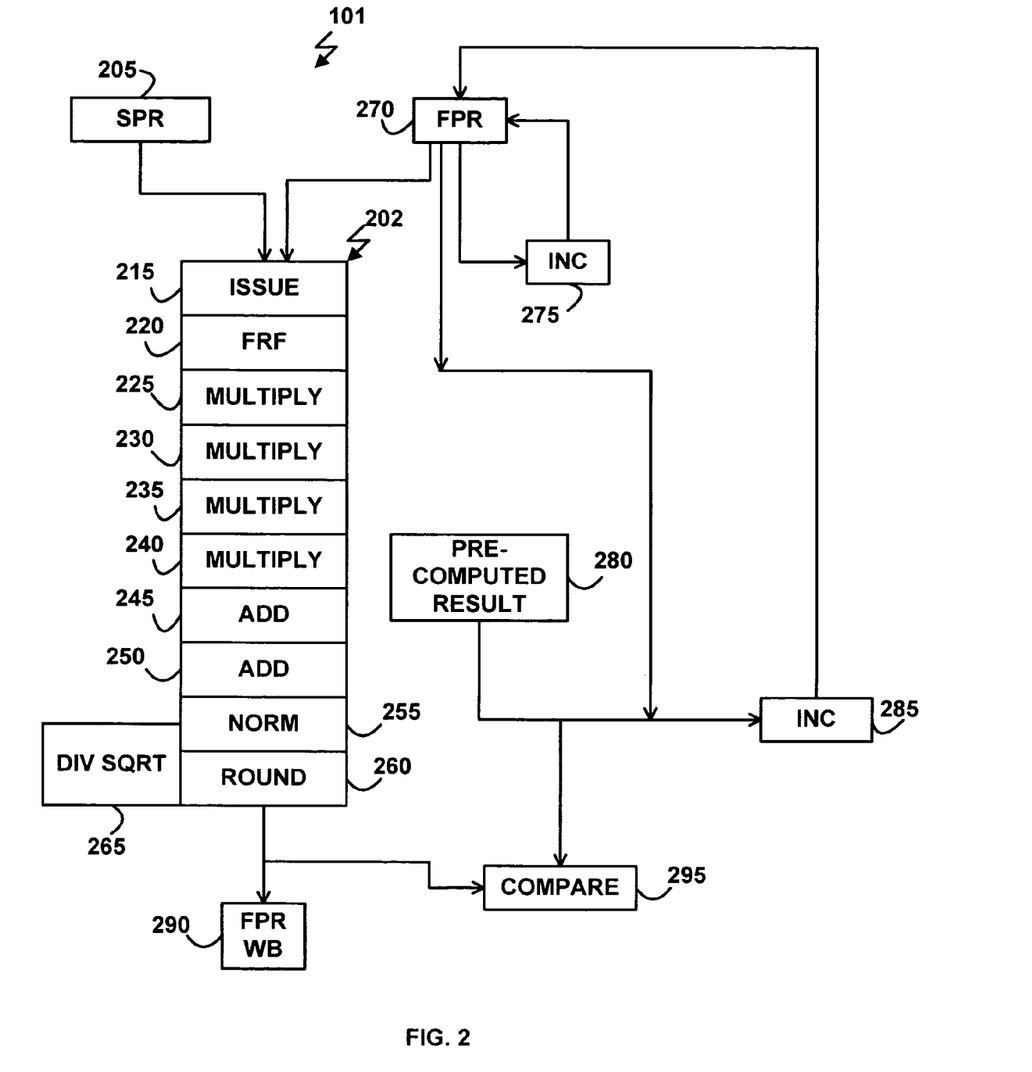
FIG. 2 depicts a high-level block diagram of the major hardware components of a processor, according to an embodiment of the invention.

FIG. 2 is a high-level block diagram of the major components of the processor 101, according to an embodiment of the invention. In an embodiment, the components shown in FIG. 2 are packaged in a single semiconductor chip, but in other embodiments the components of the processor 101 may be implemented in any number of chips. In an embodiment, the processor 101 is a Single Instruction, Multiple Data (SIMD) processor. In another embodiment, the processor 101 is a Multiple Instruction, Multiple Data (MIMD) processor, also known as a Very Long Instruction Word (VLIW) or Wide Issue Superscalar, in which the instruction contains multiple independent operation codes, each corresponding to a respective pipeline.

The processor 101 includes a multiply/adder (MADD) pipeline 202 for a floating point unit with a special purpose register (SPR) 205 and a floating point register 270 as inputs and a floating point register write back (FPR WB) 290 and a compare unit 295 receiving output from the MADD pipeline 202. The processor 101 further includes an increment (INC) unit 275 connected to the floating point register 270, a pre-computed result unit 280 connected to the compare unit 295, and an increment unit (INC) 285 receiving input from the pre-computed result 280 and sending output to the floating point register 270.

The following functional stages of the MADD pipeline 202 are illustrated: issue 215, register file (FRF) 220, multiply (M) 225, 230, 235, and 240, add 245 and 250, norm 255, round 260, and divide/square root (DIV SQRT) 265, but in other embodiments any appropriate functional stages of the MADD pipeline 202 may be present.

Ordinary applications rarely, if ever, utilize the MADD pipeline 202 100% of the time. Even on very computational-intensive applications, such as weather forecasting, 50% utilization of the MADD pipeline 202 is typical. So, typically, at least half of the cycles of the MADD pipeline 202 are idle and not used by ordinary applications. The MADD pipeline 202 includes an issue unit 215, which determines what set of instructions are put in the pipe for each processor cycle. The issue unit 215 detects a few cycles ahead of time an event that will cause idle cycles at the processor. Examples of such events are a cache miss or a task switch, but in other embodiments the issue unit 215 may detect any appropriate operation that causes the MADD pipeline 202 to be idle.

Instead of doing nothing during idle cycles, when the number of expected idle cycles exceeds a threshold, the issue unit 215 accesses a very short instruction sequence from the special purpose register 205 and sends it through the MADD pipeline 202. The sequence can be as short as one instruction. In an embodiment, the issue unit 215 determines the number of diagnostic instructions in the suite to issue based on the number of expected idle cycles, in order to complete the diagnostic instructions within the available idle cycles. In an embodiment, the special purpose register 205 includes the suite of diagnostic instructions. In another embodiment, the special purpose register 205 includes an address in the memory 102 of the suite of diagnostic instructions for longer diagnostic routines.

The compare unit 295 compares the result of the diagnostic instruction sequence from the MADD pipeline 202 with the pre-computed result 280. If the result from the MADD pipeline 202 does not equal the pre-computed result 280, then an error has been detected, and an error trap invokes the diagnostic code 170 (FIG. 1).

In an embodiment, the first instruction in the diagnostic suite uses initial values in an extra temporary non-architected FPR, and the next instruction increments them by a selected amount via the increment unit 275. Then, each subsequent instruction in the diagnostic suite uses incremented operands and the entire sequence of instructions is dependent on the previous instruction, each instruction using the output of the previous instruction as an input. Thus, one final result is produced, which is compared with the one pre-computed results 280. In this way, only initial input operands and one final pre-computed result 280 are necessary for any arbitrarily long sequence of diagnostic instructions.

The FPR write back unit 290 performs a register file write back of the output of the MADD pipeline 202 into an architected register (unillustrated) for normal instructions. But, when the MADD pipeline 202 is in diagnostic mode performing the diagnostic instructions, the FPR write back unit 290 does not write the result of the diagnostic instructions to an architected register. In another embodiment when the sequence of diagnostic instructions only partially completes within the idle time that was available, the FPR write back unit 290 may save the intermediate result in another non-architected register, which the issue unit 215 may retrieve on the next idle cycle sequence.

While various components of the processor 101 have been described and shown at a high level, it should be understood that the processor 101 may contain other components not shown, which are not essential to an understanding of the present invention. For example, various additional special purpose registers will be required in a typical design. Furthermore, it will be understood that the processor 101 of FIG. 2 is simply one example of a processor architecture, and that many variations could exist in the number, type and arrangement of components within the processor 101, that components not shown may exist in addition to those depicted, and that not all components depicted might be present in a processor design. For example, the number and configuration of buffers and caches may vary; the number and function of execution unit pipelines may vary; and registers may be configured in different arrays and sets. Further, while FIG. 2 illustrates a dedicated floating point MADD pipeline 202, in other embodiments any appropriate type of pipeline may be present.

Figure 3:
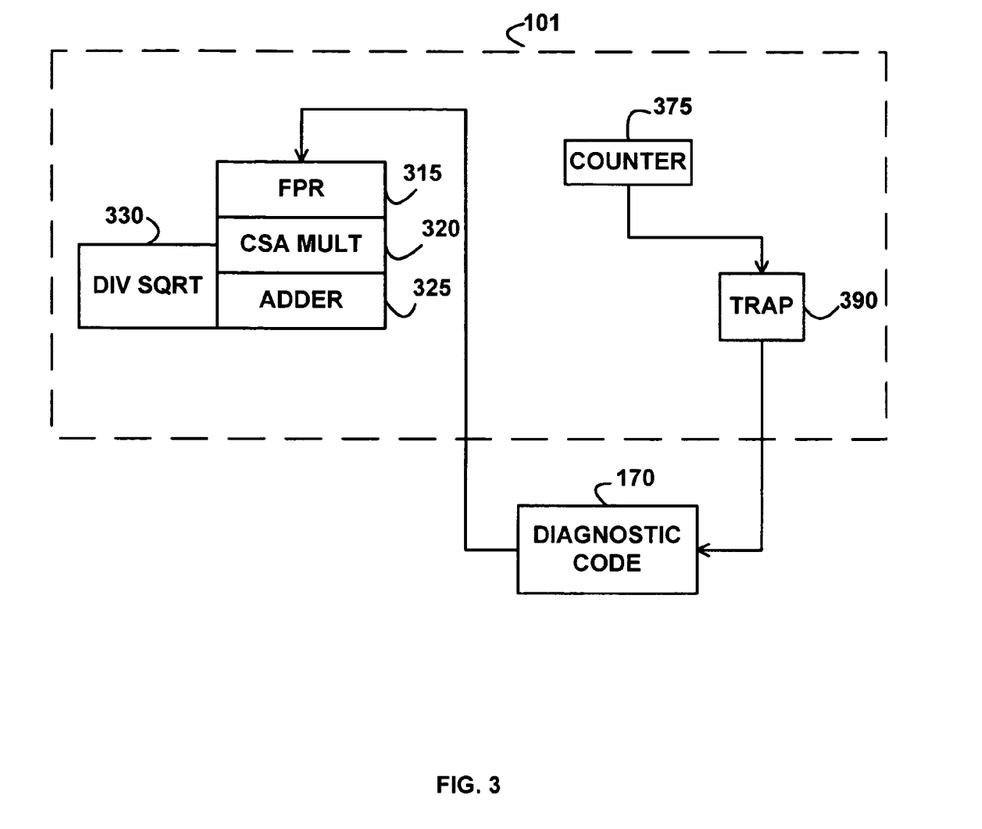
FIG. 3 depicts a high-level block diagram of the major hardware components of a processor, according to another embodiment of the invention.

FIG. 3 depicts a high-level block diagram of the major hardware components of the processor 101, according to an embodiment of the invention. The processor 101 includes a floating point register (FPR) 315, a carry-save-adder multiplier (CSA MULT) 320, an adder 325, a divide square root unit (DIV SQRT) 330, a counter 375, and a trap 390 to the diagnostic code 170.

The counter 375 increments until a threshold is exceeded, which causes the trap 390 to invoke the diagnostic code 170 regardless of whether the processor 101 is idle. The threshold is set to a high enough value, so that performance of the computer system 100 is not unduly affected. The diagnostic code 170 selects diagnostic instructions to issue to the processor 101 based on the saved data regarding previous errors encountered by the processor 101 in the error log 172 and the saved data regarding the workload of the processor 101 in the history data 174. For example, the diagnostic code 170 targets the diagnostics to the instructions that are being performed most frequently, the units in the processor 101 that are being exercised most intensely, or to the units that have failed the most in the past. The functions of the diagnostic code 170 are further described below with reference to FIG. 4.

Figure 4:
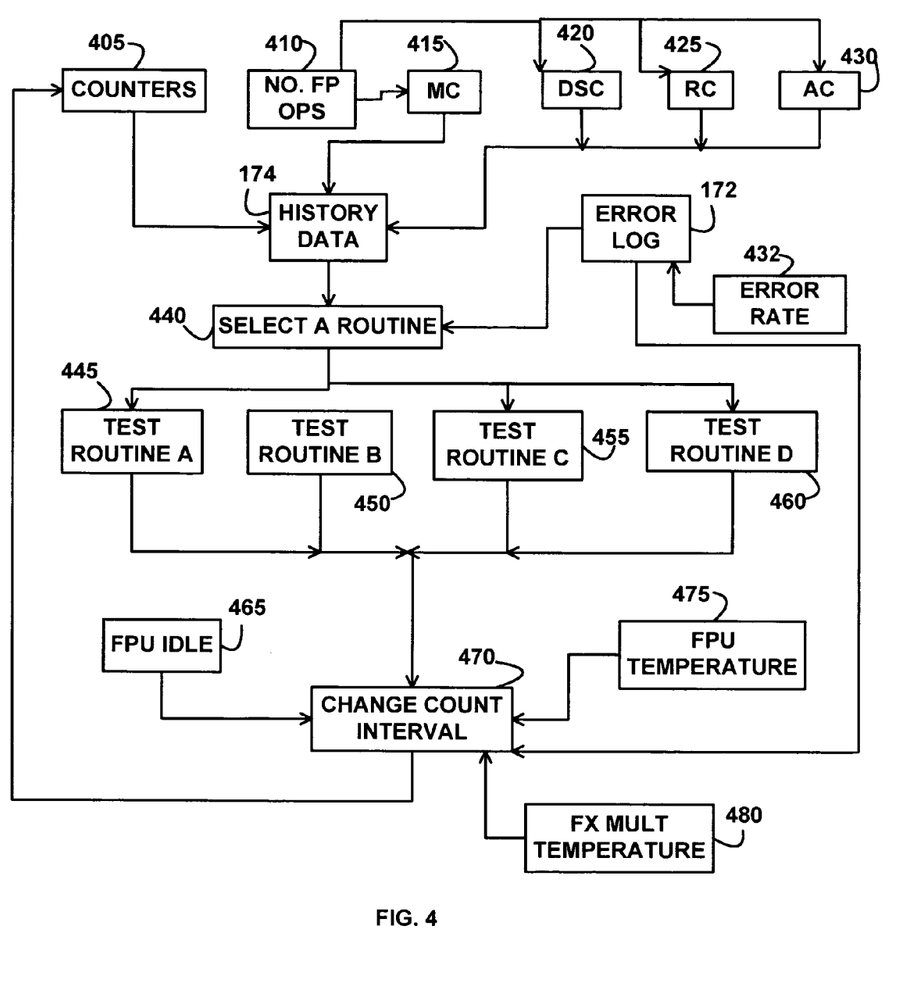
FIG. 4 depicts a high-level flowchart illustrating adaptive error checking, according to an embodiment of the invention.

FIG. 4 depicts a high-level flowchart illustrating adaptive error checking, according to an embodiment of the invention. The counters 405 keep track of, for all the subunits of the processor 101, how much the subunits are being used. In various embodiments, the counters 405 may keep a total number of operations performed or a number of operations performed per unit of time, such as the number of multiply operations per second or the number of divide operations per second. In an embodiment, separate counters 405 are kept for different units in the processor 101, e.g., a set of counters for floating point units and another set of counters for fixed point units. In an embodiment, the counters 405 are saved into the history data 174 during idle cycles of the processor 101.

An example of the counters 405 is the number of floating point operations 410, which represents the total number of floating point operations performed by the processor 101. From the number of floating point operations 410 various other counters may be derived, such as the percentage (MC) 415 of the total number of floating point operations 410 that were multiply operations, the percentage (DSC) 420 of the total number of floating point operations 410 that were divide or square root operations, the percentage (RC) 425 of the total number of floating point operations 410 that were round operations, and the percentage (AC) 430 of the total number of floating point operations 410 that were add operations. Although only floating point operations are illustrated in 410, 415, 420, 425, and 430 in another embodiment counts and percentages may also be kept for fixed point operations. The various counters 415, 420, 425, and 430 are saved in the history data 472 during idle cycles of the processor 101.

The error rate 432 is a dynamic error indication of how often the subunits of the processor 101 are encountering errors. The error rate 432 is saved in the error log 172, which may be kept on a task basis.

At block 440, the diagnostic code 170 selects a diagnostic routine to issue to the processor 101 based on the error log 172 and the history data 174. For example, if the activity indicated in the history data 174 for the floating point unit is high and its error rate is high in the error log 172, then the diagnostic code 170 may select a routine that emphasizes testing the floating point unit versus a unit that has a low activity rate and a low error rate, and vice versa. For example, the diagnostic code 170 may select test routine A at block 445, test routine B at block 450, test routine C at block 455, or test routine D at block 460, but in other embodiments any number of routines with any appropriate diagnostic instructions may be used.

Based on the inputs of the FPU idle 465, the FPU temperature 475, and the FX Multiplier temperature 480, at block 470 the diagnostic code 170 changes the interval in which the counters 405 are sampled. The FPU idle 465 is an indication of how often the floating point unit is idle. In various embodiments, the FPU idle 465 may be expressed as a counter of how often the floating point unit of the processor 101 was idle or a binary indication of whether the floating point unit is currently idle. The FPU temperature 475 is an indication of the temperature of the floating point unit of the processor 101. The FX Multiplier temperature 480 is an indication of the temperature of the multiply unit of the fixed point unit of the processor 101. The floating point unit and the fixed point unit are examples only, and any unit of the processor 101 may have its temperature taken. If the processor is exposed to an increased error rate due to overheating, then the diagnostic code 170 initiates more error detection instructions and interrupts execution of the processor 101 more frequently. When execution is interrupted more frequently, the processor 101 is cooled down because the diagnostic routines do not perform nearly as much switching activity as do the non-diagnostic instructions, such as tight computational sequence loops.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
   detecting an event that would cause cycles to be idle in a processor;
   selecting diagnostic instructions based on a number of the cycles that would be idle;
   issuing the diagnostic instructions to the processor during the cycles that would be idle, wherein the issuing further comprises using initial values in a first diagnostic instruction and incrementing operands of respective next diagnostic instructions, wherein the respective next diagnostic instructions use output of respective previous instructions as input;
   if the diagnostic instructions partially complete during the cycles that would be idle, saving an intermediate result and retrieving the intermediate result on a next idle cycle sequence; and
   comparing a final result of the diagnostic instructions with a pre-computed result "upon completion of the diagnostic instructions".

2. The method of claim 1, wherein the event comprises a cache miss.

3. The method of claim 1, wherein the event comprises a task switch.

4. An apparatus comprising:

means for detecting an event that would cause cycles to be idle in a processor;

means for selecting diagnostic instructions based on a number of the cycles that would be idle;

means for issuing the diagnostic instructions to the processor during the cycles that would be idle, wherein the means for issuing further comprises means for using initial values in a first diagnostic instruction and incrementing operands of respective next diagnostic instructions, wherein the respective next diagnostic instructions use output of respective previous instructions as input;

means for saving an intermediate result and retrieving the intermediate result on a next idle cycle sequence if the diagnostic instructions partially complete during the cycles that would be idle; and means for comparing a final result of the diagnostic instructions with a pro-computed result "upon completion of the diagnostic instructions".

5. A processor comprising:

an issue unit to detect an event that would cause cycles to be idle in the processor and issue diagnostic instructions during the cycles that would be idle to a pipeline, wherein a first diagnostic instruction uses initial values;

an increment unit to increment operands of respective next diagnostic instructions, wherein the respective next diagnostic instructions use output of respective previous instructions as input;

a write back unit to save an intermediate result of the diagnostic instructions and retrieve the intermediate result on a next idle cycle sequence if the diagnostic instructions partially complete during the cycles that would be idle; and a compare unit to compare the pro-computed result with a final result of the diagnostic instructions "upon completion of the diagnostic instructions".

6. The processor of claim 5, wherein the issue unit is further to select the diagnostic instructions based on a number of the cycles.

7. The processor of claim 5, wherein the event comprises a cache miss.

8. The processor of claim 5, wherein the event comprises a task switch.

* * * * *